US011953027B2

(12) United States Patent
Madsen et al.

(10) Patent No.: US 11,953,027 B2
(45) Date of Patent: Apr. 9, 2024

(54) OFFSHORE WIND TURBINE WITH A FLUID SUPPLY ASSEMBLY

(71) Applicant: Siemens Gamesa Renewable Energy A/S, Brande (DK)

(72) Inventors: Finn Daugaard Madsen, Billund (DK); Mikkel Serup, Brande (DK)

(73) Assignee: Siemens Gamesa Renewable Energy A/S, Brande (DK)

(*) Notice: Subject to any disclaimer, the term of this patent is extended or adjusted under 35 U.S.C. 154(b) by 0 days.

(21) Appl. No.: 17/847,349

(22) Filed: Jun. 23, 2022

(65) Prior Publication Data
US 2023/0020149 A1 Jan. 19, 2023

(30) Foreign Application Priority Data

Jul. 19, 2021 (EP) .................................. 21186324

(51) Int. Cl.
*F04D 7/02* (2006.01)
*F03D 13/25* (2016.01)
*H02K 7/18* (2006.01)

(52) U.S. Cl.
CPC ............... *F04D 7/02* (2013.01); *F03D 13/25* (2016.05); *H02K 7/183* (2013.01); *F05B 2220/61* (2013.01); *F05B 2220/706* (2013.01)

(58) Field of Classification Search
CPC ............ F03D 13/25; F04D 7/02; H02K 7/183
See application file for complete search history.

(56) References Cited

U.S. PATENT DOCUMENTS

| 5,592,028 A | 1/1997 | Pritchard |
| 7,075,189 B2* | 7/2006 | Heronemus ............. B63B 35/44 290/55 |
| 2003/0168864 A1* | 9/2003 | Heronemus ............. F03D 9/255 290/55 |
| 2004/0050760 A1 | 3/2004 | Siegfriedsen |
| 2009/0115190 A1* | 5/2009 | Devine ...................... C25B 9/70 204/554 |
| 2009/0313896 A1* | 12/2009 | Glidewell ................. C25B 1/04 48/190 |
| 2010/0244450 A1* | 9/2010 | Tabe ...................... F03B 13/262 290/55 |

(Continued)

FOREIGN PATENT DOCUMENTS

| CN | 111926852 A | 11/2020 |
| EP | 3760860 A1 | 1/2021 |

(Continued)

*Primary Examiner* — Tulsidas C Patel
*Assistant Examiner* — Thomas K Quigley
(74) *Attorney, Agent, or Firm* — Schmeiser, Olsen & Watts, LLP

(57) ABSTRACT

An offshore wind turbine erected in a body of water including a generator, a base, a nacelle, a tower having a first end mounted to the base and a second end supporting the nacelle, an electrolytic unit electrically powered by the generator to produce hydrogen from an input fluid, in particular water, and a fluid supply assembly for supplying the input fluid from a fluid inlet arranged below a water level to the electrolytic unit arranged above the water level, wherein the fluid supply assembly includes a pump and a fluid connection between the fluid inlet and the electrolytic unit.

16 Claims, 6 Drawing Sheets

(56) References Cited

U.S. PATENT DOCUMENTS

| | | | |
|---|---|---|---|
| 2012/0119510 A1* | 5/2012 | Herzen | F03D 15/10 |
| | | | 290/55 |
| 2013/0026764 A1* | 1/2013 | Hayashi | H01F 27/025 |
| | | | 290/55 |
| 2013/0099496 A1* | 4/2013 | Solheim | F03D 9/48 |
| | | | 114/294 |
| 2013/0115534 A1 | 5/2013 | Tai et al. | |
| 2015/0130191 A1* | 5/2015 | Houvener | F03D 13/25 |
| | | | 290/55 |
| 2018/0134344 A1 | 5/2018 | Dagher et al. | |
| 2019/0249648 A1 | 8/2019 | Van Hinsbergh | |
| 2021/0404439 A1 | 12/2021 | Kinsella | |

FOREIGN PATENT DOCUMENTS

| | | |
|---|---|---|
| EP | 3796494 A1 | 3/2021 |
| JP | 2004537668 A | 12/2004 |
| JP | 2018513808 A | 5/2018 |
| NL | 2019168 B1 | 1/2019 |
| TW | 201320457 A | 5/2013 |
| TW | 201425649 A | 7/2014 |
| WO | 2009155140 A1 | 12/2009 |
| WO | 2020095012 A1 | 5/2020 |

\* cited by examiner

OFFSHORE WIND TURBINE WITH A FLUID SUPPLY ASSEMBLY

CROSS-REFERENCE TO RELATED APPLICATIONS

This application claims priority to EP Application No.21186324.6, having a filing date of Jul. 19, 2021, the entire contents of which are hereby incorporated by reference.

FIELD OF TECHNOLOGY

The following relates to an offshore wind turbine with a fluid supply assembly. The following further relates to a method of supplying input fluid to an offshore wind turbine.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

Wind turbines are placed at locations providing high wind amounts. These locations can be remote onshore locations or offshore locations on the sea. For the transportation of the electrical energy, the power generated by the generator of the wind turbine travels to a transmission substation of the wind farm, where it is converted to high voltage, usually between 130-765 kV, for long distance transmission on the transmission grid over power lines. The transmission grid connects the remote location of the wind farm to a transformer station of the electrical grid, which transforms the electricity to a voltage compatible with the electrical grid.

A problem of remote wind farms is that the distance between the wind farm and the transformer station of the electrical grid needs to be bridged. Long power lines with very high installation costs are required.

The current development of the technology of wind turbines tends to an increased size of wind turbines for harvesting more wind energy, with longer blades and higher towers. Due to the increasing size of wind turbines, more power is supplied to the grid which is to be transported from the wind farm to the nearest input point of the grid. Increasing the power transferred over the long-distance power lines results in higher requirements for the cables and higher costs.

To reduce the amount of energy transferred by the power lines of the transmission grid or to avoid the use of long-distance power lines completely, an electrolytic unit can be installed in the vicinity of the wind turbine. A wind turbine comprising an electrolytic unit generates electrical power by means of the generator and hydrogen by means of the electrolytic unit driven by at least a part of the power of the wind turbine.

Electrolytic units are power-to-gas units configured to produce hydrogen. Hence, the energy produced by the wind turbine may be used in an electrolysis process to generate hydrogen and oxygen. These gases can be used afterwards for the generation of electrical energy in fuel cells or to produce chemicals, such as ammonia or methane. The produced gases from the electrolytic unit can be transported by using a pipeline or by pressurizing the gas into a container, which is less expensive than transporting electricity directly over long-distance power lines.

The use of electrolytic units in combination with wind turbines is known from the conventional art, for example in the document U.S. Pat. No. 5,592,028 A, where a plurality of electrolysis cells are connected to a wind farm and produce hydrogen by means of the electricity produced by the generators of the wind turbines. Similarly, the document WO 2020/095012 A1 describes an offshore wind turbine system for the large-scale production of hydrogen, which includes a floating tower structure with a desalination unit and an electrolysis unit.

In a wind farm with an electrolytic unit, hydrogen is produced with an input fluid. For example, for offshore wind farms, the input fluid is seawater, which is desalinated before entering the electrolytic device. Alternatively, the offshore wind farm might be located on a lake or any water body and the input fluid is water, which is usually filtered prior to entering the electrolytic device. A problem offshore wind turbines face is that the input fluid has to be supplied to the electrolytic unit platform where the electrolytic unit is arranged, where the height difference between the water level and the electrolytic unit platform has to be overcome. This is achieved by means of a fluid supply assembly. Traditional fluid supply assemblies comprise a hose hanging in the water with a submerged pump. The hose is designed to protect the pump and the pipeline from external forces from the wind and the waves.

Hanging fluid supply assemblies have the risk of the hose colliding against the tower, thereby damaging itself and the tower due to strong winds. The hose is also exposed to harsh environmental conditions and has to overcome heights often over 20 meters above the water level, so a damage of the hanging fluid supply results in high costs of materials and working hours so as to replace damaged components.

SUMMARY

An aspect relates to provide an offshore wind turbine with a fluid supply assembly that overcomes the problems known from the conventional art.

According to embodiments of the invention, an offshore wind turbine erected in a body of water comprises a generator, a base, a nacelle, a tower having a first end mounted to the base and a second end supporting the nacelle, an electrolytic unit electrically powered by the generator to produce hydrogen from an input fluid, in particular water, and a fluid supply assembly for supplying the input fluid from a fluid inlet arranged below a water level to the electrolytic unit arranged above the water level. The fluid supply assembly comprises a pump and a fluid connection between the fluid inlet and the electrolytic unit.

Hence, the generator generates electric power and supplies the electrolytic unit with at least a part of the power generated, as both components are electrically coupled.

Due to the fluctuation of the power generation, depending for example on weather conditions and wind levels, it is difficult to foresee the power output of an offshore wind turbine to the electricity grid or to an energy storage device. By using a part of the energy produced by the generator to produce hydrogen, the fluctuations can be mitigated. The hydrogen can be taken out of the wind turbine by a system outlet coupled to the output of the electrolytic unit.

Hence, at least a part of the energy produced by the generator can be used to power an electrolytic unit, so that the electricity grid is not overloaded by peaks of power generation of the fluctuating power generation facility. Additionally, if a problem in the output to the electricity grid occurs, the power can be redirected completely to the electrolytic unit so that only hydrogen, is produced. The hydrogen produced is usually in a gaseous state, which can be compressed and/or mixed with other components to a liquid state which is easier to store and/or transport.

The electrolytic unit can also be a mixed gas generator which performs electrolysis and generates other gases. For example, the electrolytic unit can perform electrolysis on water and carbon dioxide to generate a mixed gas made of hydrogen and carbon monoxide. Alternatively, hydrogen can be mixed with natural gas, which increases the hydrogen/carbon ratio of the hydrogen and gives it a flame speed up to eight times higher than compressed natural gas.

The electrolytic unit is used to produce hydrogen from water. Hence, if the wind turbine is installed in the vicinity of water, i.e., a river or at the sea, the electrolytic unit can use this water as an input to the electrolytic unit to produce hydrogen and oxygen. It is however also possible to further process the hydrogen and get other compounds, such as methane or ammonia.

The water is extracted by means of the fluid supply assembly.

According to embodiments of the invention, the fluid inlet comprises an opening in the base or in the tower below the water level through which the input fluid is transported to the electrolytic unit.

Hence, the base has an opening or a hole to collect the water. The location of the opening at the base should be chosen in such a way that the opening is always submerged below the water level, considering the tidal movements of the water.

According to an embodiment of the invention, the base is a foundation mounted to the floor of the body of water.

The base is a foundation which may be suitable for shallow and/or intermediate deep waters, such as in coastal waters. The type of foundation can be selected from the group consisting of a monopile foundation, a jacket frame foundation, a tripod foundation, a gravity base foundation, a suction bucket formation, a tubular truss foundation or a tri-pile foundation.

Hence, the offshore wind turbine is connected to the seabed or to the bed of the body of water by means of the foundation.

According to another embodiment of the invention, the offshore turbine is a floating wind turbine, wherein the base is a floating, a semi-submerged or a submerged base platform.

The base is a floating, a semi-submerged or a submerged base platform which may be suitable for deep waters. The type of base platform can be selected from the group consisting of a floater, a tensioned-leg platform TLP or a semi-submersible platform.

The base platform can be anchored to an underwater ground to limit the freedom of movement of the floating offshore wind turbine in horizontal directions, i.e. in directions which are substantially parallel to the surface of the water. Floating offshore bases have typically no fixed vertical positions to be able to compensate sea level variations. For the anchoring, it is possible to use at least one cable or chain, typically a plurality of chains, cables or lines, the latter also called moorings in the nautical context.

According to another embodiment of the invention, the offshore wind turbine further comprises an electrolytic unit platform supporting at least a part of the electrolytic unit above the water level.

With the dedicated electrolytic unit platform, the electrolytic unit can be more easily mounted than for example by installing the electrolytic unit on the nacelle and at least a part of the electrolytic unit can be kept above the water level.

According to another embodiment of the invention, the offshore wind turbine comprises a transition piece between the base and the tower or between the base and the electrolytic unit platform.

The transition piece is disposed on top of the base. A type of coupling is a transition piece disposed on top of a monopile, where the transition piece includes the electrolytic unit platform disposed on an outer periphery of the transition piece.

According to another embodiment of the invention, the fluid supply assembly comprises a filter for filtering the input fluid. Hence, particles and other substances in the water are filtered prior to entering the electrolytic unit.

According to another embodiment of the invention, the fluid inlet is arranged at a distance sufficiently removed from the ground level for avoiding the introduction of sand or other substances from the ground level into the fluid inlet. The ground level is the level below the body of water, for example the seabed level. This method reduces the costs of filtering, as less energy and maintenance of the filters is needed.

According to another embodiment of the invention, a pipeline connects the fluid inlet with the electrolytic unit. The pipeline can be contained in a caisson, i.e., a watertight retaining structure.

According to another embodiment of the invention, the pipeline extends at least partially through the inner part of the base. The pipeline is for example at least partially at the radial inner part of the base and extends in the longitudinal direction parallel to the axis of the base and/or the tower towards the electrolytic unit platform of the wind turbine.

According to another embodiment of the invention, the pipeline extends partially through the inner part of the tower. The pipeline is therefore partially at the radial inner part of the outer circumference of the tower and extends in the longitudinal direction parallel to the axis of the base and/or the tower towards the electrolytic unit platform of the wind turbine. This is the case if the transition between base and tower happens below the location of the electrolytic unit. Hence, the first part of the pipeline extends through the base and the second part of the pipeline extends through the tower.

According to another embodiment of the invention, the pipeline is formed of a polymer material or an epoxy material with a supporting fiber reinforcement to avoid corrosion.

According to another embodiment of the invention, the pipeline is formed of glass fiber.

According to another embodiment of the invention, the pump is installed inside the pipeline, wherein the pump can be lifted through the pipeline for inspection and maintenance works. The pump can also be lowered through the pipeline. Additionally, the pump can also be raised to be above the water level to protect the pump against corrosion and the marine environment when it is not being used. This also limits the marine growth on the pump and on the pipeline.

The pump can be raised also due to harsh weather conditions, i.e. due to a storm or the like to protect the pump.

A crane can be installed to move the pump to a location where it can be serviced more easily.

According to another embodiment of the invention, the filter is installed inside the pipeline, wherein the filter can be lifted through the pipeline for cleaning, inspection and maintenance works.

According to another embodiment of the invention, the pipeline is sealed to avoid any leakage to the tower and/or the base. Leakages might lead to corrosion of the inner parts of the tower and/or the base and should therefore be avoided.

The sealing can be achieved by a bolted flange between the pipeline and any component connected to the pipeline.

According to another embodiment of the invention, at least a part of the fluid connection is a channel drilled at the base and/or at the tower. Hence, a channel is drilled at the base, at the tower or both at the base and the tower to connect the fluid inlet with the electrolytic unit. Hence, as an alternative or in addition to a pipeline, a channel could be used. The walls of the channel could be protected with anticorrosive material to avoid the corrosion of the components due to the continuous exchange of water, in particular saltwater, bringing new oxygen in and promoting a corrosive environment.

According to another embodiment of the invention, the fluid inlet comprises an angled fitting made from an antifouling material, such as copper, to avoid plant growth, in particular marine growth, on the fluid inlet. In particular, any inert material can be used as antifouling material to prevent the formation of plants on the fluid inlet, which obstructs the water flow.

According to another embodiment of the invention, the angled fitting is sealed to avoid any leakage to the tower and/or the base. Leakages might lead to corrosion of the tower and/or the base and should therefore be avoided.

The sealing can be achieved by a bolted flange between the angled fitting and the pipeline or any component connected to the angled fitting.

Yet another aspect of embodiments of the invention relate to a method of supplying input fluid to an offshore wind turbine comprising the steps of suctioning input fluid through the fluid inlet arranged below the water level, and pumping the input fluid from the fluid inlet to the electrolytic unit by means of the pump.

BRIEF DESCRIPTION

Some of the embodiments will be described in detail, with reference to the following figures, wherein like designations denote like members, wherein.

DETAILED DESCRIPTION

Figure 1:
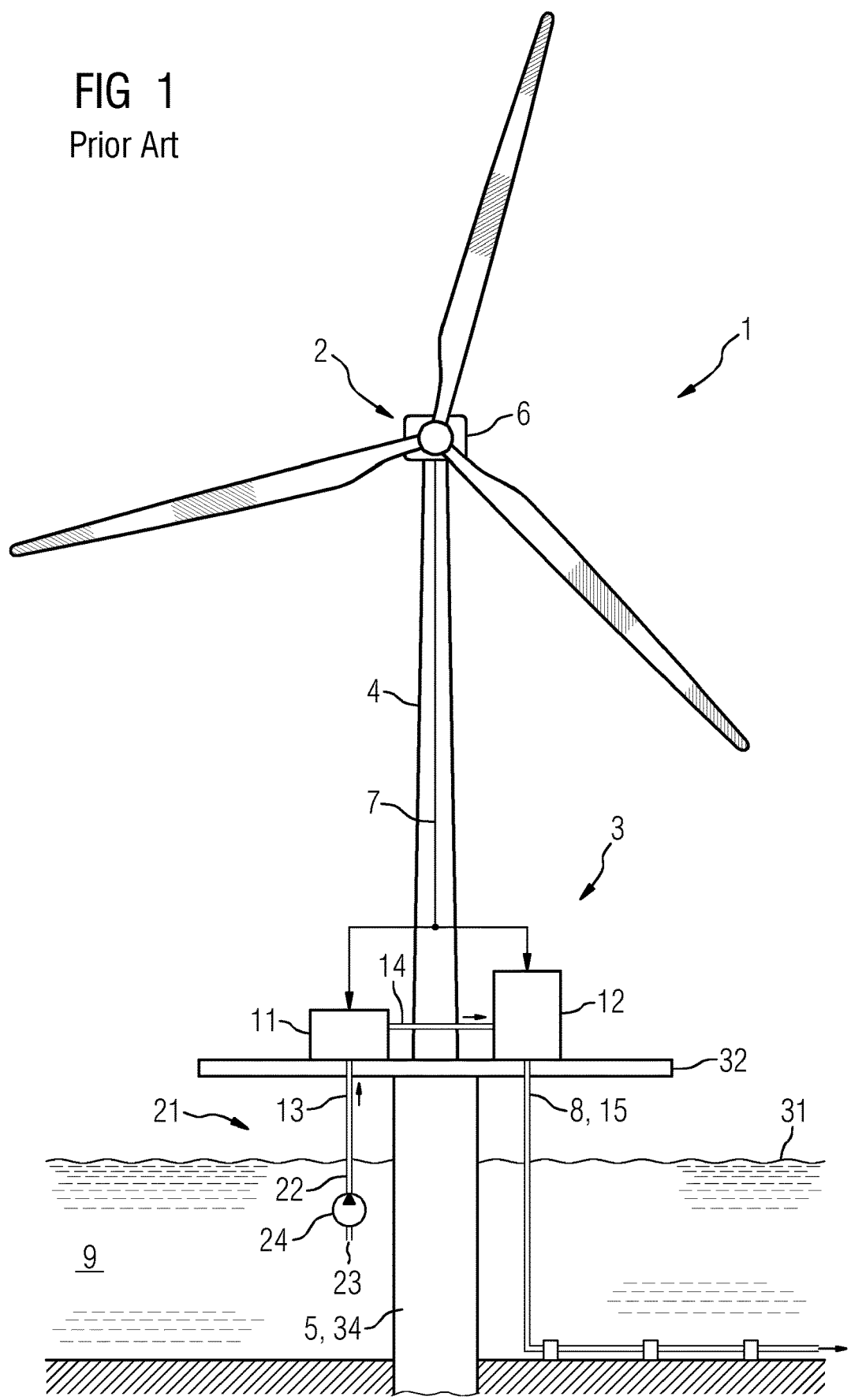
FIG. 1 shows a schematic view of an offshore wind turbine as known in the conventional art comprising a hose hanging from the electrolytic unit for the fluid supply.

FIG. 1 shows a schematic view of an offshore wind turbine 1 as known in the conventional art comprising a hose hanging from the electrolytic unit 3 for the fluid supply.

The offshore wind turbine 1 comprises a tower 4 on top of which a nacelle 6 is rotatably mounted. The offshore wind turbine 1 further comprises a hub which is connected to the nacelle 6. A plurality of blades is mounted on the hub. The hub is connected to a generator 2 and is rotatably mounted about a rotor axis by means of a main bearing. The offshore wind turbine 1 further comprises an electrolytic unit platform 32 on which the electrolytic unit 3 is arranged above the water level 31. The offshore wind turbine 1 further comprises a base 5 on which the tower 4 is mounted. The base 5 is a foundation 34 mounted to the floor of the body of water.

The power produced by the generator 2 is completely transferred to the electrolytic unit 3, but it would be also possible to connect the offshore wind turbine 1 to an electricity grid and transfer a part of the power produced by the generator 2 to the electricity grid. The electrolytic unit 3 comprises a desalination unit 11 and an electrolytic device 12, as well as a fluid connection between the desalination unit 11 and the electrolytic device 12 through which desalinated water 14 is transported. The electrolytic device 12 and the desalination unit 11 are both powered by the generator 2, which is connected to both devices by means of an electric connection 7.

The input fluid 9 for the electrolytic unit 3 is saltwater 13 taken of the sea of the offshore wind turbine 1 by means of a pump 24. The fluid supply assembly 21 supplies saltwater 13 to the electrolytic unit 3 by means of a hanging hose. The hose hangs from the desalination unit 11 to the water body at the outer part of the base 5. The saltwater 13 enters the fluid supply assembly 21 through a fluid inlet 23 and is transported through the hose, which creates a fluid connection 22 between the fluid inlet 23 and the desalination unit 11 forming part of the electrolytic unit 3. The fluid inlet 23 and the pump 24 are submerged below the water level 31 to suction the saltwater 13.

The desalinated water 14 is the input fluid 9 of the electrolytic device 12. The electrolytic device has a hydrogen output 15 through which the hydrogen 8 generated is extracted. This hydrogen output 15 is connected to a hydrogen pipeline to transport the hydrogen 8 onshore. Alternatively, the hydrogen 8 could be filled in containers and transported onshore.

Figure 2:
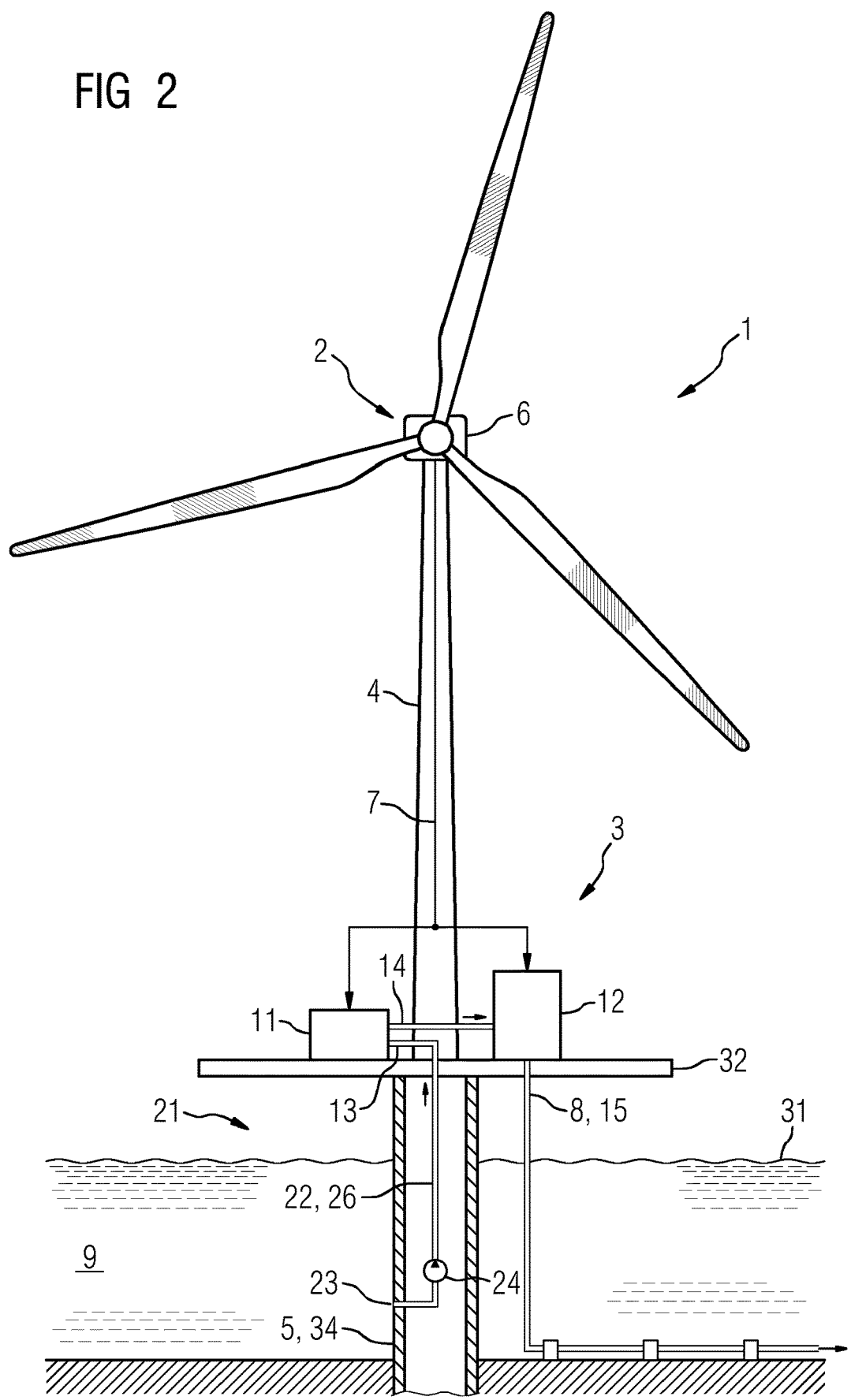
FIG. 2 shows a schematic view of an offshore wind turbine according to an embodiment of the invention comprising a fluid connection expanding through the inner part of the base.

FIG. 2 shows a schematic view of an offshore wind turbine 1 according to an embodiment of the invention comprising a fluid connection 22 expanding through the inner part of the base 5.

In this embodiment, the offshore wind turbine 1 comprises a base 5 on which the tower 4 is mounted. The base 5 is a foundation 34, such as a monopile, mounted to the floor of the body of water.

An opening at the base 5 allows for the suctioning of the saltwater 13 by means of the pump 24 of the fluid supply assembly 21 and a fluid inlet 23 arranged below the water level 31. The fluid connection 22 through the base 5 can be formed as a channel or as a pipeline 26. The fluid connection 22 extends in the longitudinal direction parallel to the axis of the base 5 and the axis of the tower 4 towards the electrolytic unit platform 32 of the offshore wind turbine 1. This fluid connection 22 extends through the inner part of the base 5, i.e. through the inner part of the foundation 34.

Figure 3:
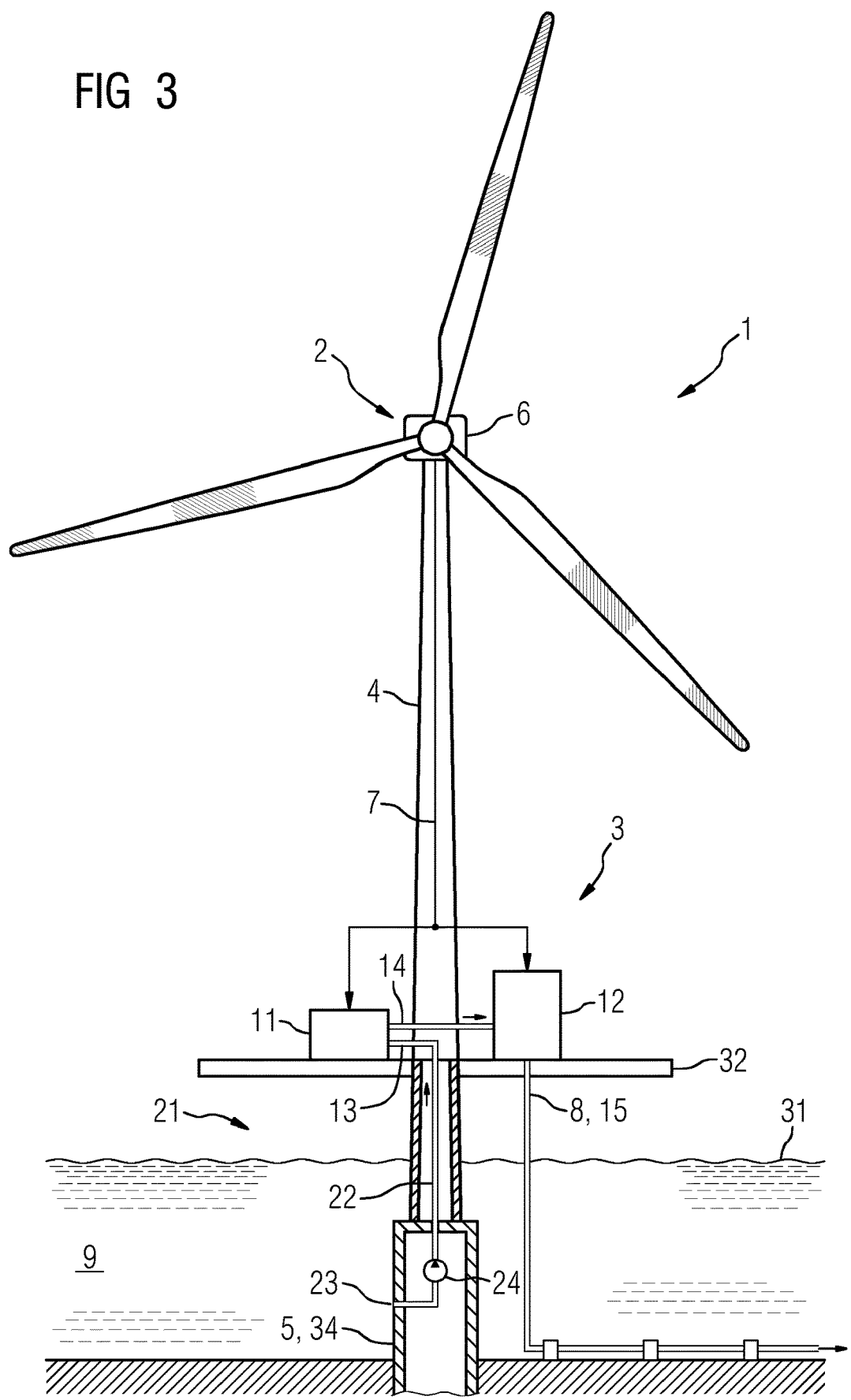
FIG. 3 shows a schematic view of an offshore wind turbine according to another embodiment of the invention comprising a fluid connection expanding through the inner part of the base and through the inner part of the tower below the electrolytic unit platform.

FIG. 3 shows a schematic view of an offshore wind turbine 1 according to another embodiment of the invention comprising a fluid connection 22 extending in the longitudinal direction parallel to the axis of the base 5 and the axis of the tower 4 towards the electrolytic unit platform 32 of the offshore wind turbine 1. This fluid connection 22 extends through the inner part of the base 5 and, as the top of the base 5 ends below the electrolytic unit platform 32, the fluid connection 22 extends through the inner part of the tower 4 below the electrolytic unit platform 32 as well. Hence, the first part of the fluid connection 22 extends through the base 5, i.e. through the inner part of the foundation 34 and the second part of the fluid connection 22 extends through the tower 4. The electrolytic unit platform 32 is arranged above the water level 31.

The fluid connection 22 through the base 5 and the tower 4 can be formed as a channel or as a pipeline 26.

An opening at the base 5 allows for the suctioning of the saltwater 13 by means of the fluid supply assembly 21 comprising a pump 24.

Figure 4:
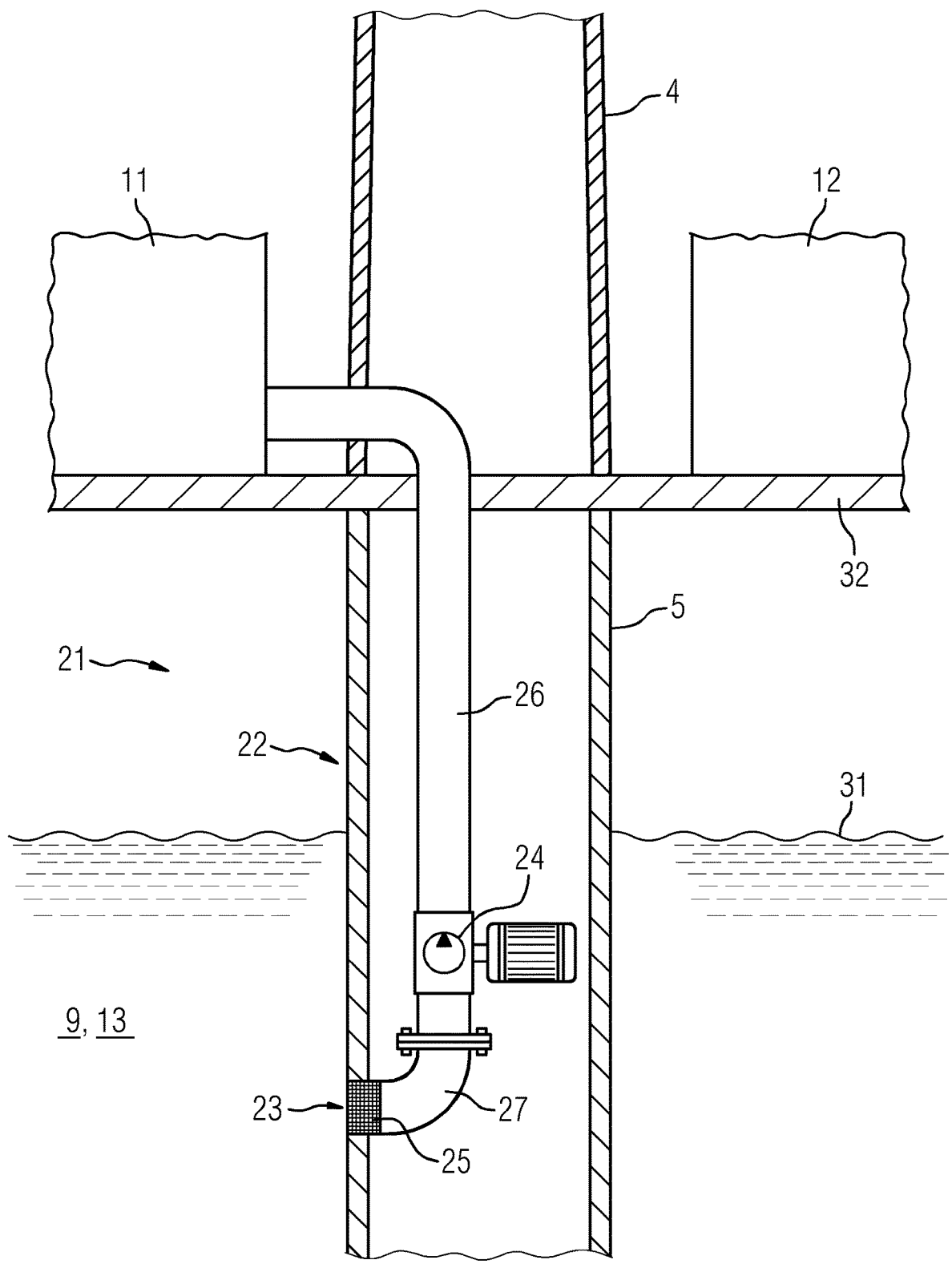
FIG. 4 shows a fluid supply assembly comprising a filter, a fluid inlet, a pump, an angled fitting and a pipeline.

FIG. 4 shows a fluid supply assembly 21 comprising a filter 25, a fluid inlet 23, a pump 24, an angled fitting 27 and a pipeline 26.

Saltwater 13 passes through the filter 25 before entering the fluid inlet 23, so sand, plants and other unwanted substances are kept outside the fluid supply assembly 21. The angled fitting 27 turns the flow of saltwater 13 to the upright direction so as to be directed towards the electrolytic unit 3 arranged on the electrolytic unit platform 32. To transport the saltwater 13, a pipeline 26 is used, which extends inside the base 5 to the electrolytic unit platform 32. The pipeline 26 and the angled fitting 27 are sealed by a bolted flange connection to avoid a leakage in the transition between both parts.

A pump 24 driven by a motor is used to overcome the height difference between the desalination unit 11 and the water level 31.

Figure 5:
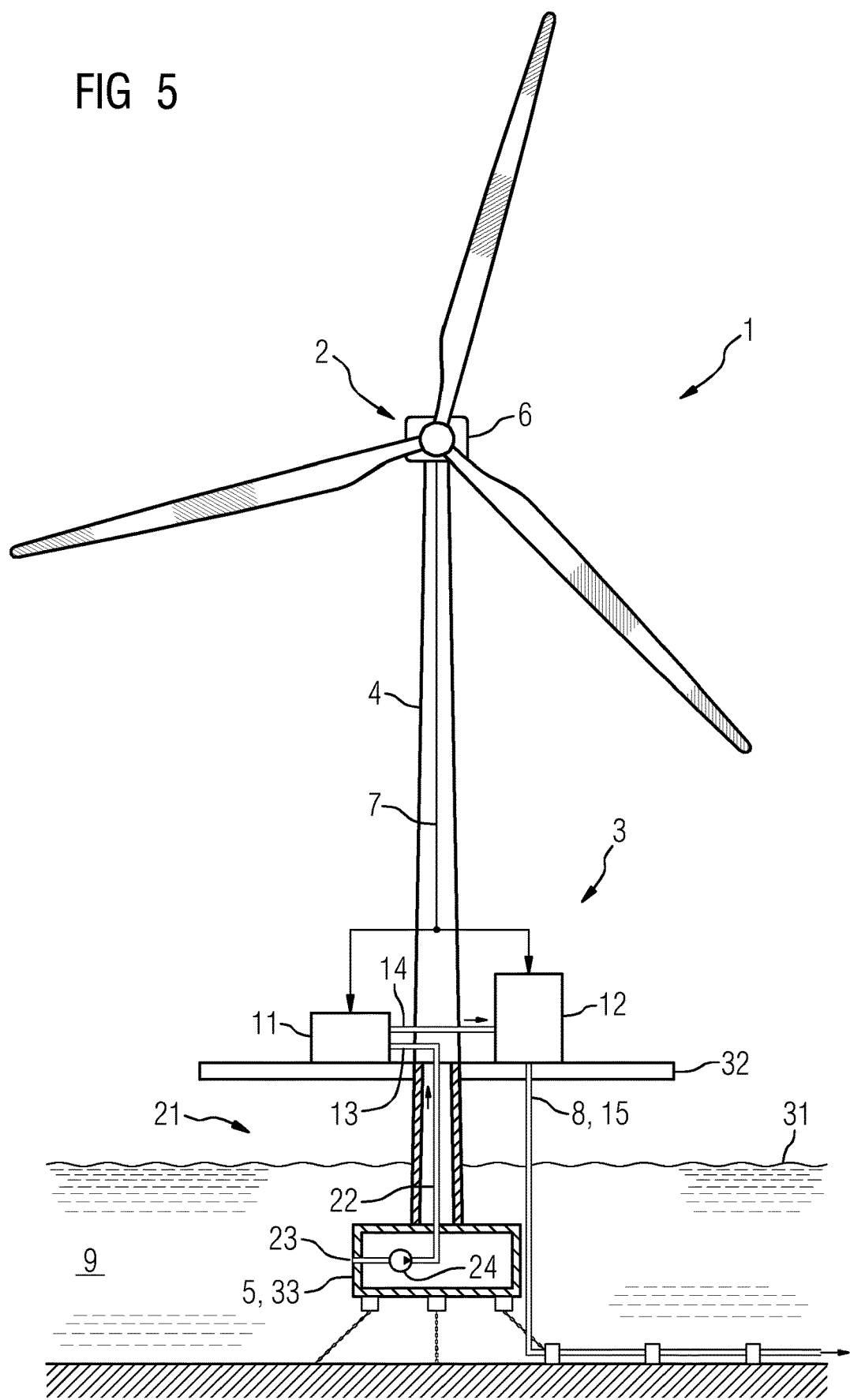
FIG. 5 shows an offshore wind turbine configured as a floating wind turbine according to another embodiment of the invention with a submerged base platform.

FIG. 5 shows an offshore wind turbine 1 configured as a floating wind turbine according to another embodiment of the invention with a submerged base platform 33.

The submerged base platform 33 is anchored to the underwater ground by a plurality of flexible coupling members such as anchoring ropes, anchor cables and anchor chains. The base platform 33 may be a box-shaped or a disc-shaped tank with a large horizontal extension and a relatively short vertical extension.

An opening at the base platform 33 allows for the suctioning of the saltwater 13 by means of the pump 24 of the fluid supply assembly 21. The fluid connection 22 through the base platform 33 can be formed as a channel or as a pipeline 26. The fluid connection 22 extends in the longitudinal direction parallel to the axis of the base platform 33 and the axis of the tower 4 towards the electrolytic unit platform 32 of the offshore wind turbine 1. This fluid connection 22 extends through the inner part of the base platform 33 and, as the top of the base platform 33 ends below the electrolytic unit platform 32, the fluid connection 22 extends through the inner part of the tower 4 below the electrolytic unit platform 32 as well.

In other embodiments, the base platform 33 can be of the spar-buoy type. Spar-buoys consist of a single long cylindrical tank and achieve stability by moving the center of mass as low as possible. In still other embodiments, the base platform 33 can be a more complex structure and includes three or more buoyant columns to support the offshore wind turbine 1.

Figure 6:
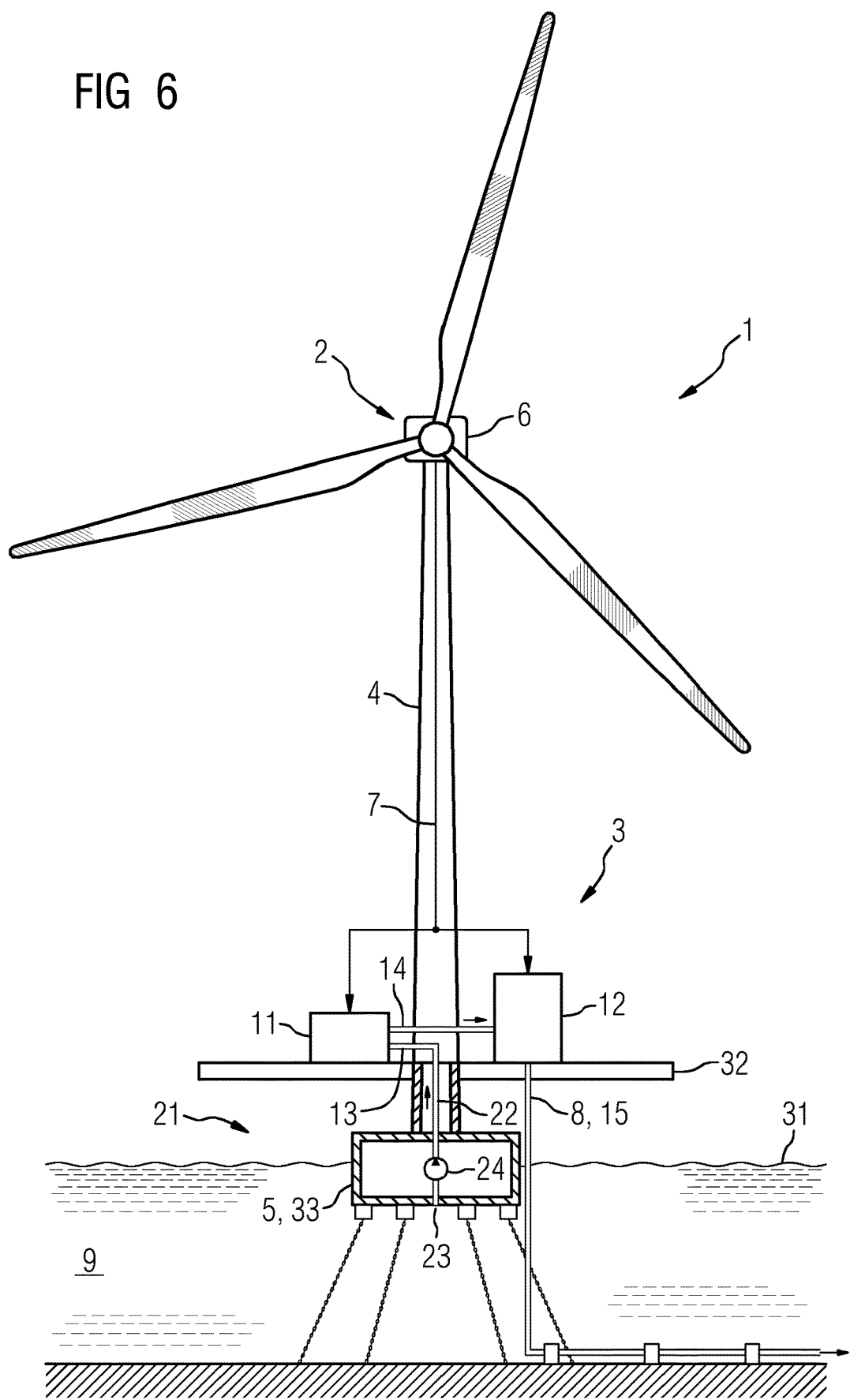
FIG. 6 shows an offshore wind turbine configured as a floating wind turbine according to another embodiment of the invention with a semi-submerged base platform.

FIG. 6 shows an offshore wind turbine 1 configured as a floating wind turbine according to another embodiment of the invention with a semi-submerged base platform 33.

The semi-submerged base platform 33 is anchored to the underwater ground by a plurality of flexible coupling members such as anchoring ropes, anchor cables and anchor chains. The base platform 33 is anchored in such a way that the upper part of the base platform 33 stays above the water.

The setup of the fluid connection 22 is similar to the one shown in FIG. 5.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Offshore wind turbine
2 Generator
3 Electrolytic unit
4 Tower
5 Base
6 Nacelle
7 Electrical connection
8 Hydrogen
9 Input fluid
11 Desalination unit
12 Electrolytic device
13 Saltwater
14 Desalinated water
15 Hydrogen output
21 Fluid supply assembly
22 Fluid connection
23 Fluid inlet
24 Pump
25 Filter
26 Pipeline
27 Angled fitting
31 Water level
32 Electrolytic unit platform
33 Base platform
34 Foundation

The invention claimed is:

1. An offshore wind turbine erected in a body of water comprising:
   a generator,
   a base,
   a nacelle,
   a tower having a first end mounted to the base and a second end supporting the nacelle,
   an electrolytic unit electrically powered by the generator to produce hydrogen from an input fluid, and
   a fluid supply assembly for supplying the input fluid from a fluid inlet arranged below a water level to the electrolytic unit arranged above the water level,
   wherein the fluid supply assembly comprises a pump and a fluid connection between the fluid inlet and the electrolytic unit, wherein the fluid inlet comprises an opening in the base or in the tower below the water level through which the input fluid is transported to the electrolytic unit, wherein a pipeline connects the fluid inlet with the electrolytic unit, wherein the pipeline extends at least partially through the inner part of the base, wherein the pump is installed inside the pipeline, and wherein the pump is configured to be lifted through the pipeline for inspection and maintenance.

2. The offshore wind turbine according to claim 1, wherein the base is a foundation mounted to the floor of the body of water.

3. The offshore wind turbine according to claim 1, wherein the offshore wind turbine is a floating wind turbine, wherein the base is a floating, a semi-submerged or a submerged base platform.

4. The offshore wind turbine according to claim 1, wherein the offshore wind turbine further comprises an electrolytic unit platform supporting at least a part of the electrolytic unit above the water level.

5. The offshore wind turbine according to claim 1, wherein the fluid supply assembly comprises a filter for filtering the input fluid.

6. The offshore wind turbine according to claim 1, wherein the fluid inlet is arranged at a distance sufficiently removed from the ground level for avoiding the introduction of sand or other substances from the ground level into the fluid inlet.

7. The offshore wind turbine according to claim 1, wherein the pipeline extends partially through an inner part of the tower.

8. The offshore wind turbine according to claim 1, wherein the pipeline is formed of a polymer material or an epoxy material with a supporting fiber reinforcement to avoid corrosion.

9. The offshore wind turbine according to claim 1, wherein the pipeline is sealed to avoid any leakage to the tower and/or the base.

10. The offshore wind turbine according to claim 1, wherein at least a part of the fluid connection is a channel drilled at the base and/or at the tower.

11. The offshore wind turbine according to claim 1, wherein the fluid inlet comprises an angled fitting made from an antifouling material to avoid plant growth on the fluid inlet.

12. The offshore wind turbine according to claim 11, wherein the angled fitting is sealed to avoid any leakage to the tower and/or the base.

13. A method of supplying input fluid to the offshore wind turbine according to claim 1, the method comprising the steps of:
suctioning input fluid through the fluid inlet arranged below the water level, and
pumping the input fluid from the fluid inlet to the electrolytic unit by means of the pump.

14. The offshore wind turbine according to claim 11, wherein the antifouling material is copper.

15. The offshore wind turbine according to claim 11, wherein the antifouling material prevents marine growth.

16. An offshore wind turbine comprising:
a generator,
a base,
a nacelle,
a tower having a first end mounted to the base and a second end supporting the nacelle,
an electrolytic unit electrically powered by the generator to produce hydrogen from an input fluid, and
a fluid supply assembly for supplying the input fluid from a fluid inlet arranged below a water level to the electrolytic unit arranged above the water level,
wherein the fluid supply assembly comprises a pump and a fluid connection between the fluid inlet and the electrolytic unit,
wherein the fluid inlet comprises an opening in the base or in the tower below the water level,
wherein a pipeline connects the fluid inlet with the electrolytic unit, and
wherein the pipeline extends at least partially through an inner part of the base and/or an inner part of the tower, wherein the pump is installed inside the pipeline, and wherein the pump is configured to be lifted through the pipeline for inspection and maintenance.

* * * * *